(12) United States Patent
Chien

(10) Patent No.: US 10,084,955 B2
(45) Date of Patent: Sep. 25, 2018

(54) AUTO FOCUS PHOTOGRAPHING SYSTEM AND ELECTRONIC DEVICE EMPLOYING THE SAME

(71) Applicant: Chiun Mai Communication Systems, Inc., New Taipei (TW)

(72) Inventor: How-Wen Chien, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 114 days.

(21) Appl. No.: 15/362,735

(22) Filed: Nov. 28, 2016

(65) Prior Publication Data

US 2017/0155830 A1    Jun. 1, 2017

(30) Foreign Application Priority Data

Dec. 1, 2015 (CN) .......................... 2015 1 0864800

(51) Int. Cl.
| | |
|---|---|
| *H04N 5/232* | (2006.01) |
| *G06T 7/00* | (2017.01) |
| *H04N 5/225* | (2006.01) |
| *H04N 5/247* | (2006.01) |
| *H04N 7/18* | (2006.01) |

(52) U.S. Cl.
CPC ......... *H04N 5/23219* (2013.01); *G06T 7/004* (2013.01); *G06T 7/0012* (2013.01); *H04N 5/2254* (2013.01); *H04N 5/2258* (2013.01); *H04N 5/23212* (2013.01); *H04N 5/23222* (2013.01); *H04N 5/247* (2013.01); *H04N 7/188* (2013.01); *G06T 2207/30041* (2013.01)

(58) Field of Classification Search
CPC ............. H04N 5/23219; H04N 5/2258; H04N 5/23212
See application file for complete search history.

(56) References Cited

U.S. PATENT DOCUMENTS

2015/0003819 A1* 1/2015 Ackerman ............. G03B 13/02
396/51

* cited by examiner

*Primary Examiner* — Nam Pham
(74) *Attorney, Agent, or Firm* — ScienBiziP, P.C.; Steve Reiss

(57) ABSTRACT

An auto focus photographing system applied in an electronic device that is worn before eyes of a user is provided. The auto focus photographing system includes a first camera module, a second camera module, and a processor. The first camera module captures images of the eyes. The second camera module captures images of objects that the eyes focus on. The processor analyzes a distance between centers of eye pupils of the user and calculates a focusing current value corresponding to the distance, and adjusts a focus distance of the second camera module accordingly. The processor detects a capture command and the second camera module captures an image according to the adjusted focus distance. An electronic device employing the auto focus photographing system is also provided.

20 Claims, 3 Drawing Sheets

AUTO FOCUS PHOTOGRAPHING SYSTEM AND ELECTRONIC DEVICE EMPLOYING THE SAME

FIELD

The subject matter herein generally relates to an auto focus photographing system based on pupil identification and an electronic device employing the auto focus photographing system.

BACKGROUND

Electronic devices normally include a camera module for daily photographing. Sometimes a short moment may be missed in daily life and it's too late to take out the electronic device to take pictures. Therefore, user may need an electronic device with a camera module which may auto focus and quickly take pictures.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
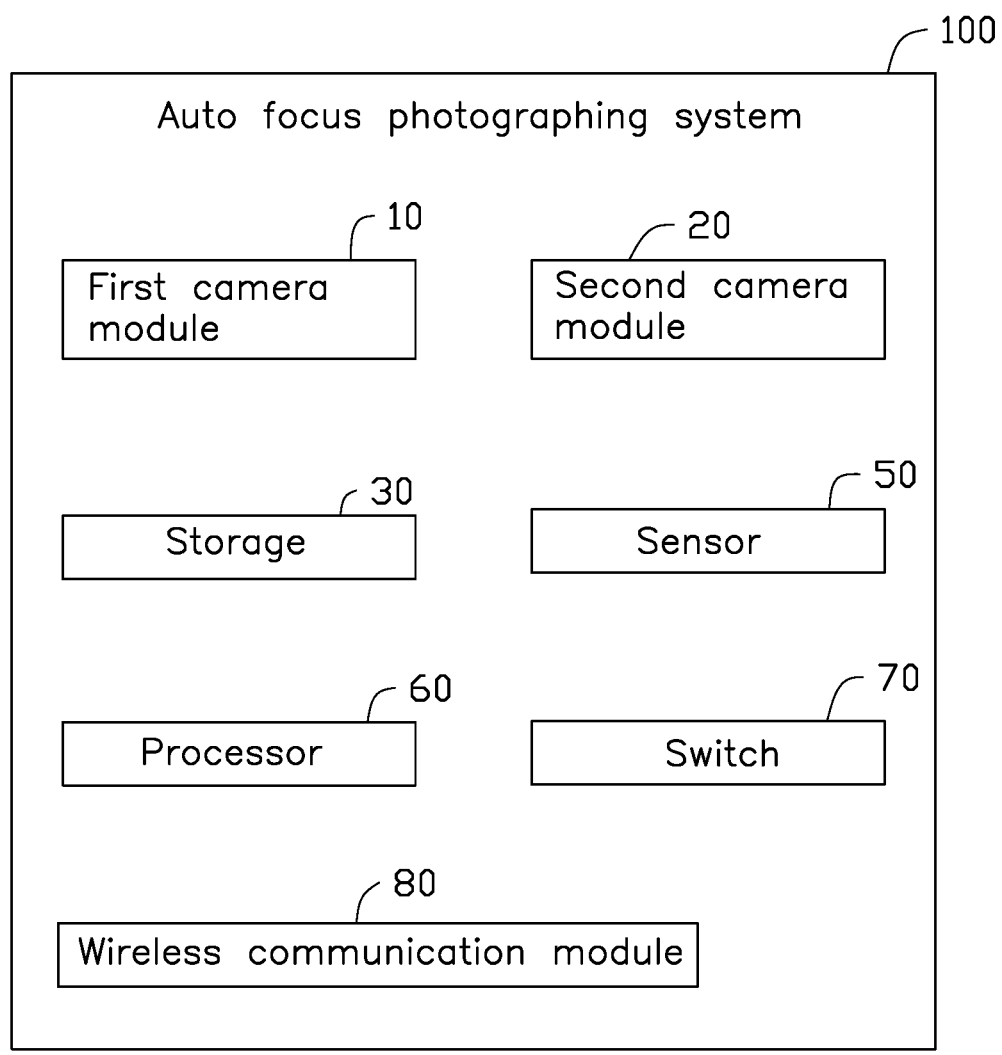
FIG. 1 is a block diagram of an exemplary embodiment of an auto focus photographing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
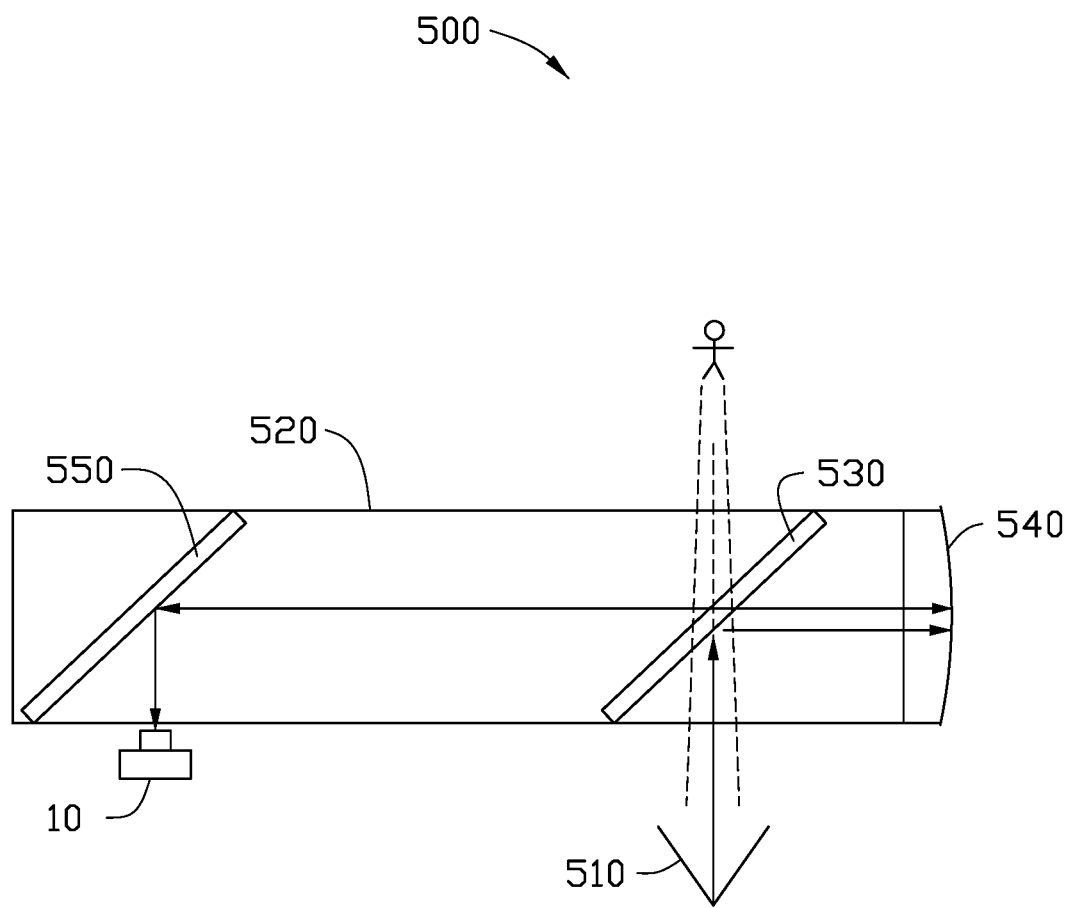
FIG. 2 is a planar view of a first embodiment of a smart glasses.

FIG. 1 and FIG. 2 illustrate an auto focus photographing system 100 applied in an electronic device. The electronic device can be a pair of smart glasses 500, which can be worn before the eyes of a user. The auto focus photographing system 100 includes a first camera module 10, a second camera module 20, a storage 30, a sensor 50, a processor 60, a switch 70 and a wireless communication module 80.

The first camera module 10 is configured to capture a distance between centers of eye pupils of a user who wearing the smart glasses 500 and determine a current focus position of the eye pupils. And this means to determine the object that the user is looking at. In at least one embodiment, the first camera module 10 includes two lenses, which are installed on the smart glasses 500. One of the two lenses is configured to capture an image of an eye of the user, while the other one of the two lenses is configured to capture an image of the other eye of the user. That is the eye pupils are in a capturing range of the two lenses, respectively. The first camera module 10 is further configured to detect movements of the eyes of the user. Particularly, the first camera module 10 keeps capturing the eye pupils every a predetermined time interval, and then compares a distance change of centers of the eye pupils of two continuous captures, thus to determines a focus change of the eye pupils. In at least one embodiment, the focus distance of the first camera module 10 is fixed.

Referring to FIG. 2, the pair of smart glasses 500 of a first embodiment can be worn to the front of the eyes 510 of the user. The pair of smart glasses 500 includes a left part and a right part corresponding to the eyes 510. However, a left part of the smart glasses 500 is shown in FIG. 2 and includes a frame 520, a first lens 530, a second lens 540, a third lens 550 and the lens of the first camera module 10 corresponding to the left eye. The right part of the smart glasses 500 is substantially the same as the left part shown in FIG. 2. The first lens 530, the second lens 540 and the third lens 550 are mounted on the frame 520, the eye 510 and the first camera module 10 are on a same side of the frame 520. The first lens 530 is inclined and aligns to the eye 510. The first lens 530 is a partial transmission and partial reflection lens. The second lens 540 and the third lens 550 are mounted on two opposite sides of the first lens 530. The second lens 540 and the third lens 550 both are reflection lens. The third lens 550 aligns to the first camera module 10. The user may see the environment of the side of the frame 520 opposite to the eye of the user via the first lens 530. A part of the light beam from the eye 510 is reflected by the first lens 530 to the second lens 540, the light beam is further reflected by the second lens 540 to pass through the first lens 530 and reaches the third lens 550, and then the light beam is reflected by the third lens 550 to the first camera module 10, thus the first camera module 10 captures the centers of the eye pupils.

Figure 3:
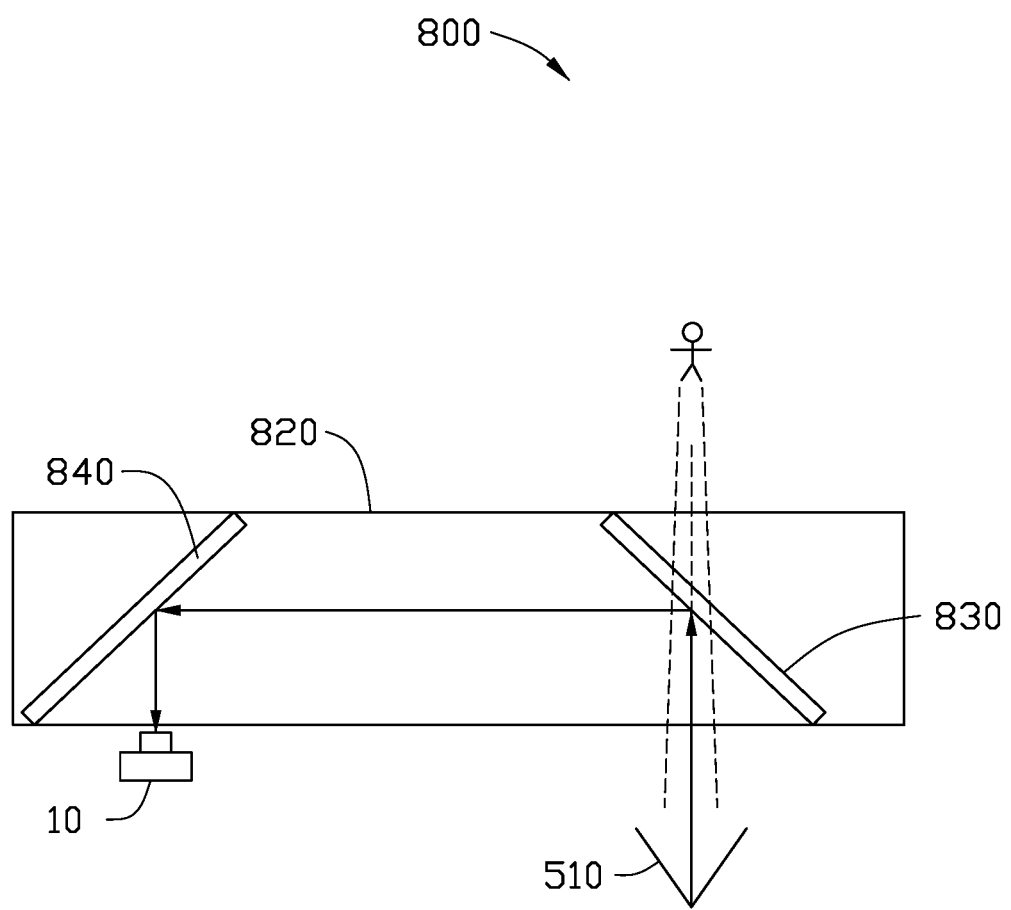
FIG. 3 is a planar view of a second embodiment of a smart glasses.

Referring to FIG. 3, the pair of smart glasses 800 of a second embodiment can be worn to the front of the eyes 510 of the user. The pair of smart glasses 800 includes a left part and a right part corresponding to the eyes 510. However, a left part of the smart glasses 800 is shown in FIG. 3 and includes a frame 820, a fourth lens 830, a fifth lens 840 and the lens of the first camera module 10 corresponding to the left eye. The right part of the smart glasses 800 is substantially the same as the left part shown in FIG. 3. In other embodiments, a quantity of the smart glasses 800 can be two and corresponds to the eyes of the user. The fourth lens 830 and the fifth lens 840 are mounted on the frame 820, the eye 510 and the first camera module 10 are on a same side of the frame 820. The fourth lens 830 is inclined and aligns to the eye 510. The fourth lens 830 is a partial transmission and partial reflection lens. The fifth lens 840 is mounted on a side of the fourth lens 830 and aligns to the first camera module 10. The fifth lens 840 is reflection lens. The user may see the environment of the side of the frame 820 opposite to the eye of the user via the fourth lens 830. A part of the light beam from the eye 510 is reflected by the fourth lens 830 to the fifth lens 840. The light beam is further reflected by the fifth lens 840 to the first camera module 10, thus the first camera module 10 captures the centers of the eye pupils.

It should be known that when the eyes stare at an object, the eyes may rotate relative to a vertical axis to make the image of the object be projected in centers of eye pupils. When the eyes stare at a nearer object, the eye pupils rotate closer, thus the distance between the eye pupils decrease; when the eyes stare at a farther object, the eye pupils rotate apart slightly, thus the distance between the eye pupils increase. Therefore, when the eyes stare at objects at different distances, the eyes may rotate to adjust the focus and the distance between eyes pupils is changeable accordingly.

The second camera module 20 is configured to capture a focused image. In at least one embodiment, the second camera module 20 capture an image of the object that the eyes focus at when receiving a capture command from the user. The focus distance of the second camera module 20 is adjustable. The second camera module 20 includes focusing current values corresponding to every focus distance. The electronic device may use the focusing current value to adjust the focus distance of the second camera module 20 accordingly.

The storage 30 is configured to store data captured by the first camera module 10 and the second camera module 20. The storage 30 further stores a plurality of focus distances and corresponding focusing current values of the second camera module 20.

The sensor 50 is configured to detect a capture command from the user. In at least one embodiment, the capture command can be a wink command or a sound command. The sensor 50 is an optical sensor or a sonic sensor for detecting wink command or a sound command. In other embodiments, the processor 60 may detect wink commands of the user based on the eyes of the user in the image captured by the first camera module 10.

The processor 60 is configured to establish a correspondence between eye pupils centers distances and the focusing current values of the second camera module 20. Before using the auto focus photographing system 100, the processor 60 may notify the user to look at objects at different distances according to the focus distances stored in the storage 30. The processor 60 detects and records distances between centers of eye pupils of the user when the user looks at the objects at different distances through the first camera module 10, thus to establish the correspondence between distances between the centers of the eye pupils of the user and the focusing current values of the second camera module 20. A coordinate system can be established according to the eye pupils centers distances and the corresponding focusing current values of the second camera module 20, the processor 60 connects the coordinates of the eye pupils centers distances and the corresponding focusing current values according to curve fitting method to form a continuous correspondence between all eye pupils centers distances and the focusing current values of the second camera module 20, and processor 60 further stores the correspondence to the storage 30.

The processor 60 is further configured to adjust a focus distance of the second camera module 20 according to a distance between eye pupils centers detected by the first camera module 10 and trigger the second camera module 20 to capture images when receiving capture commands. The processor 60 analyzes the images of the eyes captured by the first camera module 10, identifies eye pupils or iris in the images, thus to detect positions of centers of the eye pupils, and therefore detects a distance between the centers of the eye pupils.

The switch 70 is configured to switch on and off the auto focus photographing system 100. The first camera module 10 keeps detecting the distance change of centers of the eye pupils when the switch 70 switches on the auto focus photographing system 100.

The wireless communication module 80 is configured to establish wireless communication with portable electronic devices. The portable electronic devices can be smart phones and tablet computers, which can control the auto focus photographing system 100 to capture images via the wireless communication module 80. In at least one embodiment, the portable electronic devices can switch on and off the auto focus photographing system 100 via the wireless communication module 80, and control the second camera module 20 to capture images.

When using the auto focus photographing system 100 to capture images, the auto focus photographing system 100 can be switched on by the switch 70 or portable electronic devices via the wireless communication module 80. The processor 60 establishes the correspondence between eye pupils centers distances and the focusing current values of the second camera module 20. The first camera module 10 keeps detecting the distance change of centers of the eye pupils, every time when the eyes rotate, the first camera module 10 captures an image of the present eyes and transmits to the processor 60. The processor 60 analyzes the image of the eyes captured by the first camera module 10, identifies and detects a distance between the centers of the eye pupils. The processor 60 matches the detected distance between the centers of the eye pupils with the correspondence between eye pupils centers distances and the focusing current values of the second camera module 20 stored in the storage 30, thus to match a corresponding focusing current value according to the detected distance between the centers of the eye pupils, and thereby adjusting the focus distance of the second camera module 20 according to the matched focusing current value. When the sensor 50 detects a capture command from the user, the second camera module 20 captures an image of an object that the second camera module 20 focuses on and stores the image to the storage 30.

In other embodiment, after the processor 60 adjusts the focus distance of the second camera module 20 according to the calculated focusing current value, the processor 60 further obtains the edge sharpness of a current image that the second camera module 20 focuses at by image processing technology, and the processor 60 further adjusts the focus distance of the second camera module 20 until the edge sharpness is maximized, thus to capture images at a better focus distance.

Data captured by the first camera module 10 and the second camera module 20 can be transmitted to the portable electronic devices via the wireless communication module 80.

The auto focus photographing system 100 detects a distance between centers of eye pupils via the first camera module 10 and match to the correspondence between eye pupils centers distances and the focusing current values of the second camera module 20 stored in the storage 30, thus to control the second camera module 20 to auto focus, and then detects capture commands by the sensor 50, thereby achieving auto focus and immediate photographing.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An auto focus photographing system applied in an electronic device that is worn before eyes of a user, the auto focus photographing system comprising:
   a first camera module, the first camera module configured to capture an image of the eyes;
   a second camera module, the second camera module configured to capture an image of an object that the eyes focus on;
   a processor, the processor configured to identify eye pupils from the image captured by the first camera module and analyze a distance between centers of the eye pupils, and calculate a focusing current value corresponding to the distance, and then adjust a focus distance of the second camera module according to the focusing current value; and
   a sensor, the sensor configured to detect a capture command from the user;
   wherein the processor receives the capture command and then triggers the second camera module to capture the image of the object according to the adjusted focus distance of the second camera module.

2. The auto focus photographing system as claimed in claim 1, wherein the first camera module comprises two lenses installed on the electronic device, one of the lenses is configured to capture an image of one of the eyes and the other one of the lenses is configured to capture an image of the other one of the eyes; the processor identifies the eyes from the image captured by the first camera module to detect positions of the centers of the eye pupils, and therefore detects the distance between the centers of the eye pupils.

3. The auto focus photographing system as claimed in claim 1, wherein a focus distance of the first camera module is fixed, the focus distance of the second camera module is adjustable.

4. The auto focus photographing system as claimed in claim 1, further comprising a storage, wherein the storage stores a correspondence between focus distances and focusing current values of the second camera module, the storage stores data captured by the first camera module and the second camera module.

5. The auto focus photographing system as claimed in claim 4, wherein the processor notifies the user to look at objects at different distances according to the focus distances stored in the storage, the processor detects and records distances between centers of eye pupils of the user when the user looks at the objects at different distances through the first camera module, thus to establish a correspondence between the distances between the centers of the eye pupils of the user and focusing current values of the second camera module, and further stores the correspondence to the storage.

6. The auto focus photographing system as claimed in claim 5, wherein the first camera module keeps detecting the distance change of centers of the eye pupils, every time when the eyes rotate, the first camera module captures an image of the present eyes and transmits the image to the processor; the processor analyzes the image of the eyes captured by the first camera module, identifies and detects the distance between the centers of the eye pupils; the processor matches the detected distance between the centers of the eye pupils with the correspondence between the distances between the centers of the eye pupils and focusing current values of the second camera module stored in the storage, thus to match a corresponding focusing current value according to the detected distance between the centers of the eye pupils, and thereby adjusting the focus distance of the second camera module according to the matched focusing current value.

7. The auto focus photographing system as claimed in claim 1, wherein the capture command is a wink command or a sound command; the sensor is an optical sensor or a sonic sensor for detecting the wink command or the sound command.

8. The auto focus photographing system as claimed in claim 1, wherein the capture command is a wink command, the processor detects the wink command from the user based on the eyes of the user in the image captured by the first camera module.

9. The auto focus photographing system as claimed in claim 1, wherein after the processor adjusts the focus distance of the second camera module according to the calculated focusing current value, the processor further obtains an edge sharpness of a current image that the second camera module focuses at by image processing technology, and the processor further adjusts the focus distance of the second camera module until the edge sharpness is maximized.

10. The auto focus photographing system as claimed in claim 1, further comprising a wireless communication module, wherein the wireless communication module is configured to establish wireless communication with a portable electronic device; the auto focus photographing system is controlled by the portable electronic device via the wireless communication module, and the auto focus photographing system transmits data captured by the first camera module and the second camera module to the portable electronic device via the wireless communication module.

11. An electronic device comprising an auto focus photographing system, the electronic device is worn before eyes of a user, the auto focus photographing system comprising:
   a first camera module, the first camera module configured to capture an image of the eyes;
   a second camera module, the second camera module configured to capture an image of an object that the eyes focus on;
   a processor, the processor configured to identify eye pupils from the image captured by the first camera module and analyze a distance between centers of the eye pupils, and calculate a focusing current value corresponding to the distance, and then adjust a focus distance of the second camera module according to the focusing current value; and
   a sensor, the sensor configured to detect a capture command from the user;
   wherein the processor receives the capture command and then triggers the second camera module to capture the image of the object according to the adjusted focus distance of the second camera module.

12. The electronic device as claimed in claim 11, wherein the electronic device is a pair of smart glasses worn before and aligned to the eyes of the user.

13. The electronic device as claimed in claim 12, wherein the electronic device includes a frame, a first lens, a second lens, a third lens and a lens of the first camera module corresponding to one of the eyes; the first lens, the second lens and the third lens are mounted on the frame, the eye and the first camera module are on a same side of the frame; the first lens is inclined and aligns to the eye; the first lens is a partial transmission and partial reflection lens; the second lens and the third lens are mounted on two opposite sides of the first lens; the second lens and the third lens both are reflection lens; the third lens aligns to the first camera module.

14. The electronic device as claimed in claim 13, wherein an environment of a side of the frame opposite to the eye is visible via the first lens; a part of a light beam from the eye is reflected by the first lens to the second lens, the light beam is further reflected by the second lens to pass through the first lens and reaches the third lens, and then the light beam is reflected by the third lens to the first camera module, thus the first camera module captures the centers of the eye pupils.

15. The electronic device as claimed in claim 12, wherein the electronic device comprises a frame, a fourth lens, a fifth lens and a lens of the first camera module corresponding to one of the eyes; the fourth lens and the fifth lens are mounted on the frame, the eye and the first camera module are on a same side of the frame; the fourth lens is inclined and aligns to the eye; the fourth lens is a partial transmission and partial reflection lens; the fifth lens is mounted on a side of the fourth lens and aligns to the first camera module; the fifth lens is a reflection lens.

16. The electronic device as claimed in claim 15, wherein an environment of a side of the frame opposite to the eye of the user is visible via the fourth lens; a part of a light beam from the eye is reflected by the fourth lens to the fifth lens, the light beam is further reflected by the fifth lens to the first camera module, thus the first camera module captures the centers of the eye pupils.

17. The electronic device as claimed in claim 11, wherein the first camera module comprises two lenses corresponding to the eye pupils of the user; the processor identifies the eyes from the image captured by the first camera module, thus to detect positions of centers of the eye pupils, and therefore detects the distance between the centers of the eye pupils.

18. The electronic device as claimed in claim 11, wherein the processor notifies the user to look at objects at different distances according to the focus distances stored in the storage, the processor detects and records distances between centers of eye pupils of the user when the user looks at the objects at different distances through the first camera module, thus to establish a correspondence between the distances between the centers of the eye pupils of the user and focusing current values of the second camera module, and further stores the correspondence to the storage.

19. The electronic device as claimed in claim 18, wherein the first camera module keeps detecting the distance change of centers of the eye pupils, every time when the eyes rotate, the first camera module captures an image of the present eyes and transmits the image to the processor; the processor analyzes the image of the eyes captured by the first camera module, identifies and detects the distance between the centers of the eye pupils; the processor matches the detected distance between the centers of the eye pupils with the correspondence between the distances between the centers of the eye pupils and the focusing current values of the second camera module stored in the storage, thus to match a corresponding focusing current value according to the detected distance between the centers of the eye pupils, and thereby adjusting the focus distance of the second camera module according to the matched focusing current value.

20. The electronic device as claimed in claim 11, wherein after the processor adjusts the focus distance of the second camera module according to the calculated focusing current value, the processor further obtains an edge sharpness of a current image that the second camera module focuses at by image processing technology, and the processor further adjusts the focus distance of the second camera module until the edge sharpness is maximized.

\* \* \* \* \*